United States Patent Office 3,491,565
Patented Jan. 27, 1970

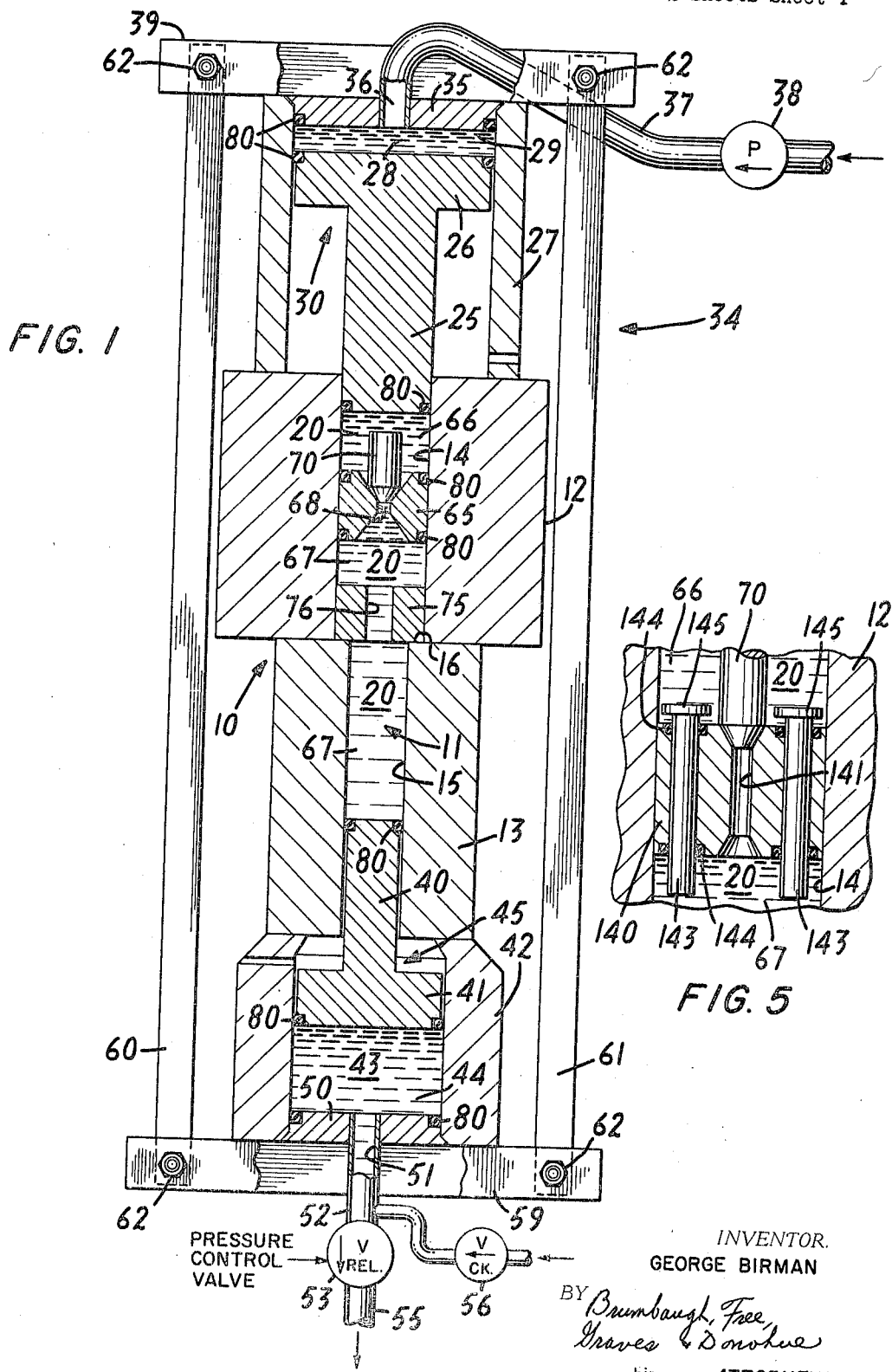

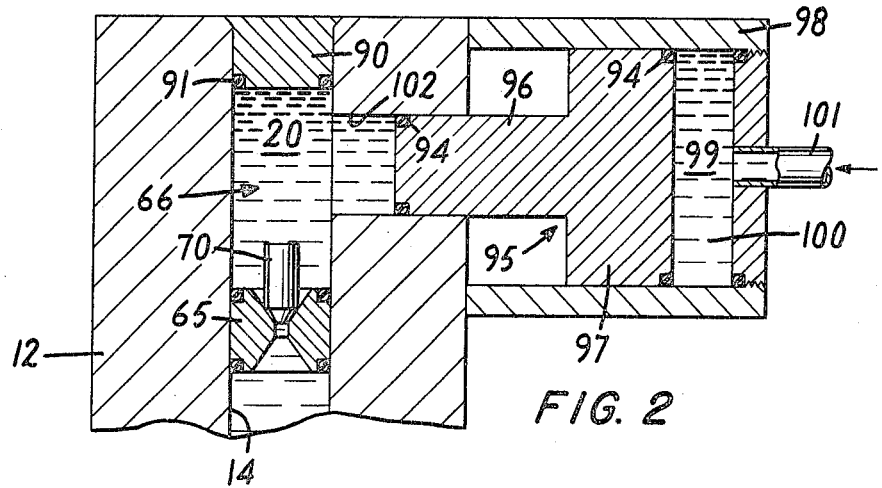
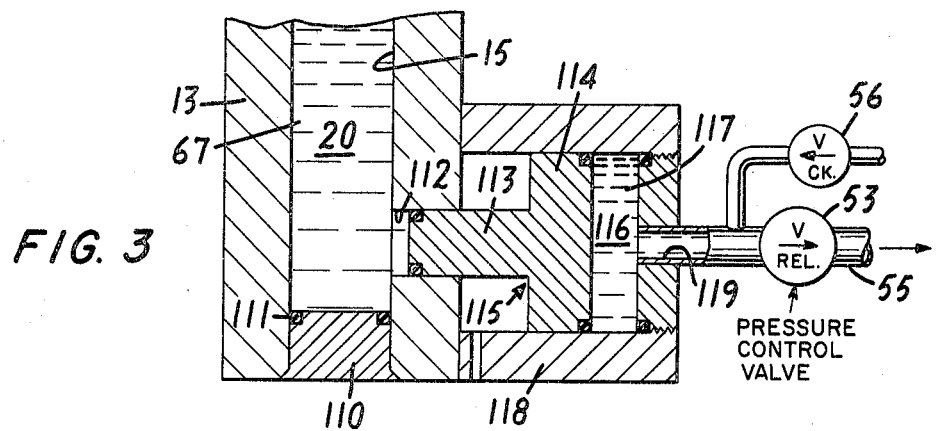
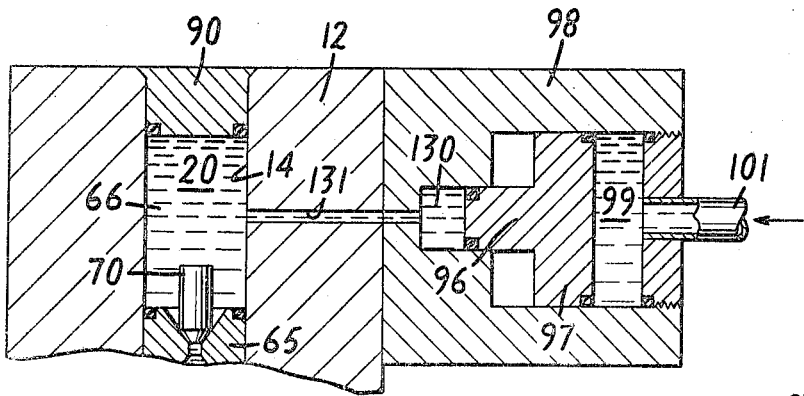

3,491,565
EQUIPMENT ADAPTED FOR HYDROSTATIC EXTRUSION AND OTHER USES
George Birman, New York, N.Y., assignor to Barogenics, Inc., Mount Vernon, N.Y., a corporation of New York
Filed Aug. 17, 1966, Ser. No. 572,946
Int. Cl. B21c 23/00
U.S. Cl. 72—60                                           8 Claims

ABSTRACT OF THE DISCLOSURE

Hydrostatic extrusion apparatus of the type wherein material is extruded from a first chamber at an extremely high pressure to a second chamber at a somewhat lesser pressure. The disclosed apparatus is provided with an arrangement of pressure intensifiers or multipliers which permit the pressure within the first and second chambers to be controlled by relief valves operating at pressures much less than the pressures within the first and second chambers.

---

This invention relates to methods and means for effecting hydrostatic extrusion. In hydrostatic extrusion, a billet is extruded through a die by high pressure developed in a hydrostatic pressure-transmissive medium enveloping the billet. Such mode of extrusion differs from conventional extrusion wherein the billet material is forced through the die by ram pressure acting directly on the billet.

As conceived originally by Bridgman, hydrostatic extrusion can be performed in two ways: The first one consists (as disclosed by Bridgman, Canadian Patent 476,-973) of extruding the billet from a chamber filled with a pressurized medium into a space filled with air or some other medium at atmospheric pressure. The second method consists (as disclosed by Bridgman, U.S. Patent 2,558,-035) of extruding the billet from a chamber filled with a pressurized medium into another chamber also filled with pressurized medium in which, however, the pressure is maintained at a lower level than in the first chamber. The first method is called liquid to air extrusion. The second, liquid to liquid extrusion.

Fundamentally, devices for liquid to air extrusion are much simpler than the devices for liquid to liquid extrusion, since the former do not require a secondary chamber which has to be pressurized and in which the pressure must be maintained at a level related to but lower than the pressure level in the first chamber.

The maintenance of a high pressure in the secondary chamber is particularly difficult because the secondary chamber must be at least as long as the extrusion, i.e., 10 feet, 12 feet, or even longer.

Bridgman has found that ductile materials can be satisfactorily extruded by the liquid to air method which is relatively simple to carry out. In that method, the pressure in the high pressure chamber is simply raised until the ductile material is plasticized and begins to escape through the die. Bridgman's experiments indicated, however, that when liquid-to-air extrusion is used with a brittle billet material, the brittle material may fracture when escaping from the die so that instead of one continuous extrusion, only fractured pieces are obtained. Bridgman concluded, therefore, that, for such brittle material, it was necessary to raise the pressure in the billet chamber to a much higher level than the extruding pressure which would provide breakthrough when the billet "saw" only atmospheric pressure in the discharge region for the billet.

In order to prevent the billet from escaping through the die, at lower pressures than desired, Bridgman suggested that a pressure opposing the extrusion of the billet be established on the escape side of the die. To obtain this opposing pressure, he proposed that a secondary pressure chamber be provided on the escape side. The pressure in that secondary chamber would be maintained at a level somewhat lower than the pressure in the billet chamber. By a proper selection of pressures in both chambers, the billet could be exposed to much higher pressure than the mentioned breakthrough pressure relative to atmospheric discharge pressure. Accordingly, it would be possible to obtain a plastic flow even in a brittle material.

Various methods and means have been proposed for adapting to practical use the Bridgman experiments on liquid-to-liquid extrusion. Such prior art liquid-liquid extrusion systems have, however, been characterized by the following disadvantages among others. First, they have lacked means for accurately maintaining statically and/or dynamically a selected relation between the pressure in the primary or billet extrusion chamber and the pressure in the secondary chamber into which the extrusion discharges.

Moreover, once the extrusion process has begun, and the extruded material begins to fill the secondary chamber, some of the liquid in the secondary chamber must be displaced by the extruded material. According to the practice of the prior art as exemplified by the mentioned U.S. Bridgman patent, the displacement problem was taken care of by allowing the displaced liquid to discharge from that chamber through a higher pressure relief valve, i.e., one operating at a pressure of, say 200,000 p.s.i. A relief valve required to operate at a pressure of that order is, however, extremely difficult to design and manufacture. Further, to assure proper operation of such a valve is difficult, and the difficulty is compounded when it is necessary to control the pressure in long cylinders in which pressure oscillations can easily occur.

It is accordingly an object of this invention to provide liquid to liquid hydrostatic extrusion systems which are free of one or more of the above-mentioned disadvantages of prior art systems which have been proposed.

Further objects of the invention are to provide control at a low pressure level over one or more of the high pressures generated in the system, to correlate the pressurizing of the discharge chamber for the extrusion with the pressurizing of the extrusion chamber for the billet, to permit ready access to one or both of the high pressure chambers of the system and to free the container shell for the high pressure chambers from any axial tensile or compressive stress.

For a better understanding of how these and other objects of the invention are realized, reference is made to the following description of exemplary embodiments thereof and to the accompanying drawings wherein:

FIG. 1 is a view in vertical cross section of a hydrostatic extrusion system according to the invention;

FIG. 2 is a view in cross-section of a modification of the upper end of the system of FIG. 1;

FIG. 3 is a view in cross-section of a modification of the lower end of the system of FIG. 1;

FIG. 4 is a view in cross section of a further modification applicable to either one or both of the modifications shown in FIGS. 2 and 3; and FIG. 5 is a view in cross section of another modification of FIG. 1.

STRUCTURE

Referring first to FIG. 1, the reference numeral 10 designates a high pressure container shell having a hollow interior 11 in the form of an axial bore open at both ends. To better withstand the high pressures developed therein container 10 may be constructed of superposed layers of ring segments connected together by axial pins as described in more detail in copending application Ser. No. 3,356,171 filed Mar. 31, 1964, and owned by the assignee hereof. The container 10 is divided into upper and lower cylindrical sections 12 and 13 which are coupled together in a fluid tight manner and which enclose, respectively, an upper bore section 14 and a lower bore section 15. As shown, lower bore section 15 is of smaller diameter than the upper bore section so that an upward facing annular shoulder 16 is formed around the opening of the lower bore section into the upper one.

In operation, the bore 11 is filled with a hydrostatic pressure transmissive medium 20 which is usually a liquid, but which may be a soft solid either at atmospheric pressure or under the high pressures generated in the bore during the extrusion process.

The upper end of bore 11 is closed by a ram 25 backed by a larger diameter ram 26 received in a hydraulic cylinder 27. Ram 26 is operably coupled with hydraulic fluid 28 in a chamber 29 formed in cylinder 27 to the rear of the larger ram. The two rams 25 and 26 form high pressure and low pressure ends, respectively, of a hydraulic pressure transformer which is generally designated as 30. Device 30 is a pressure transformer because, in operation, $P_{11}A_{11}=P_{12}A_{12}$ where $P_{11}$ is the pressure of the fluid 28 on ram 26, $P_{12}$ is the pressure of the medium 20 on ram 25, $A_{11}$ is the effective cross-sectional area of ram 26 which is subjected to pressure $P_{11}$, and $A_{12}$ is the effective cross sectional area of ram 25 which is subjected to pressure $P_{12}$. Pressure $P_{11}$ is a low pressure on the order, say, of 5,000 to 20,000 p.s.i. or thereabouts. Pressure $P_{12}$, on the other hand, is a high pressure on the order of, say, 100,000–400,000 p.s.i. or greater. Depending on which way it is driven transformer 30 is capable either of converting low pressure to high pressure (so as to be a pressure multiplier) or of converting high pressure to low pressure (so as to be a pressure attenuator). In the FIG. 1 system, device 30 is driven at its low pressure end so as to act as a pressure multiplier or intensifier.

The upper end of chamber 29 is closed by a plug type end closure 35 having therein an inlet 36 to the chamber for hydraulic fluid supplied through tubing 37 from a pump 38 or other low hydraulic pressure generating means. Plug 35 is backed by the upper crosshead 39 of a ganged-plate load bearing frame 34 similar in construction to that disclosed in French Patent 1,401,193.

The lower end of bore 11 is closed by a ram 40 backed by a larger diameter ram 41 received in a hydraulic cylinder 42 to be operably coupled with low pressure hydraulic fluid 43 contained in cylinder 42 in a chamber 44 to the rear of ram 41. Rams 40 and 41 form a hydraulic pressure transformer 45 which operably establishes the pressure relation $P_{22}A_{22}=P_{21}A_{21}$ where $P_{22}$ is the pressure of the medium 20 in bore section 15, $A_{22}$ is the effective cross section of ram 40 which is subjected to $P_{22}$, $P_{21}$ is the pressure of fluid 43, and $A_{21}$ is the effective cross-sectional area of ram 41 subjected to pressure $P_{21}$. In the FIG. 1 system, transformer 45 converts pressure $P_{22}$ of high value (e.g., 100,000 p.s.i.) to pressure $P_{21}$ of low value (e.g. 6250 p.s.i.) so as to act as a pressure attenuator.

While devices 30 and 45 are shown in FIG. 1 as being conventional high pressure transformers, either one or both of these devices may be constructed in accordance with the teachings of copending application Ser. No. 406,679, filed Oct. 27, 1964, Patent No. 3,367,163, and owned by the assignee hereof so as to provide a pressure transforming effect without Euler column bending.

The chamber 44 is closed at its lower end by a plug type end closure 50 having therein a port 51 for the fluid 43 in the chamber. Port 51 is connected by tubing 52 to a low pressure control valve 53 loaded by a compression spring (not shown). Valve 53 is a relief valve which permits fluid 43 to discharge from chamber 44 through tubing 52 and through an outlet 55 whenever the pressure $P_{21}$ exceeds the level for which the valve 53 is set. The pressure setting of the valve may be adjusted by adjusting in a conventional manner the compressive force exerted by the mentioned spring. Fluid may be introduced into chamber 44 through a check valve 56.

The closure 50 is backed by the lower crosshead 59 of frame 34, and that lower crosshead is coupled to upper crosshead 39 by a left hand set 60 of ganged tie beams and a right hand set 61 of ganged tie beams. As described in the mentioned French patent, pins 62 are employed to provide a hinge-type joining of each cross-head with each set of tie beams to thereby couple the crossheads and the tie beams together to form the closed loop frame 34.

Somewhat above the center of the pressure container 10, the bore 11 is axially divided by a die 65 into an upper billet extruding chamber 66 and a lower discharge chamber 67 for the extrusion. Chamber 67 has an upper part in cylinder 12 and a lower part in cylinder 13. Die 65 has formed therein a central axial die passage 68 connecting the two chamber 66 and 67. As a preliminary to an extruding operation, a billet 70 is seated in chamber 66 over the opening into that chamber of die passage 68.

Because the extrusion from the billet is narrower and much longer than the billet itself, the chambers 67 and 66 are correspondingly dimensioned to have 67 narrower and much longer than 66. As a result, the ram sections 40 and 41 of pressure transformer 45 are of smaller diameter than the corresponding ram sections 25 and 26 of pressure transformer 30. The pressure proportioning ratios $A_{11}/A_{12}$ and $A_{21}/A_{22}$ of, respectively, pressure transformer 30 and 45 may be the same or may be different. As an example of ratios which are different, if the pressure available from the pump 38 or other low pressure hydraulic means is 10,000 p.s.i., pressures of 200,000 p.s.i. and 100,000 p.s.i. are to be imparted to the medium 20 in, respectively, the extrusion chamber 66 and the discharge chamber 67, and the pressure relief valve is designed for settings in a pressure range centering about 6,250 p.s.i. then, transformer 30 would be designed to yield a value of 20 for its ratio $A_{11}/A_{12}$.

The die 65 is not only a die means but is also a free piston. That is, the die is in the form of an annular plug which is slidably received in the bore section 14. A limit to such downward movement is set by a stop means in the form of annular bushing 75 having a central passage 76 and received in close fitting relation within the bore section 14 to rest upon the mentioned shoulder 16.

The FIG. 1 elements 25, 26, 35, 40, 41, 50 and 65 are all equipped with seal devices 80 as shown. Each of those devices may be a seal assembly of the type disclosed by FIGS. 1–4 of U.S. Patent 3,156,475 granted Dec. 10, 1964.

The seal devices 80 around the free-piston die 65 provide between the die and the wall of bore-section 14 a pressure seal which is fluid-tight so as to prevent leakage between the die and that wall of some of the pressurized medium from chamber 66 to chamber 67 or in the opposite direction. When the billet 70 is seated over passage 68, the billet provides a seal for that passage. Hence, during the pressuring (to be described of chamber 66), the die 65 is wholly fluid tight in relation to the pressurized medium in chamber 66 so as to be capable of being moved as a free piston by the pressure of that medium.

OPERATION

To prepare the FIG. 1 system for operation, the upper right-hand pin 62 of frame 34 is removed from the frame, and the crosshead 39 is swung upwardly and leftwardly away from plug 35. That plug, device 30, die 65 and the extrusion produced by the previous operation are then removed from the apparatus.

Next, fluid is introduced through check valve 56 into chamber 44 to lift the ram sections of device 45 to the position shown in FIG. 1. Die 65 is then replaced to its shown position and is there held between the die and bore wall by friction or by any other suitable expedient which holds the die statically but permits the die to move under pressure. With the die so positioned, bore 11 is supplied with the amount of medium 20 necessary to replenish that lost during the previous extrusion. Also, a new billet 70 is seated in chamber 66 over the die passage 68. Pressure transformer 30 is replaced in cylinder 27, plug 35 is seated in the upper end of the cylinder, and the frame 34 is reclosed by replacing the upper righthand pin 62. Thereafter, chamber 29 is filled with fluid 28.

Upon completion of the mentioned preliminaries, the extrusion operation is initiated by actuating pump 38 to pressurize the fluid 28 in chamber 29. The relatively low pressure of that fluid drives pressure multiplier 30 downward to build up pressure in the medium 20 in chamber 66. The latter pressure imparts to die 65 (with the billet seated on it) a downward drive which builds up the pressure in the medium 20 in chamber 67. The pressure in the two chambers 66 and 67 initially increases at the same rate from the same zero pressure so as to be the same in value at an instant. The relatively high increasing pressure in chamber 67 is converted by pressure attenuator 45 into a relatively low but proportionately increasing pressure in chamber 44 of the fluid 43 which cannot escape from that chamber during the described initial stage of operation.

The initial pressure build-up is ended when the pressure in chamber 44 reaches the pressure level setting of valve 53. At that time, the valve opens to permit the fluid 43 to discharge from chamber 44. Because of the discharge, the pressure in the last-named chamber cannot increase further and becomes constant at the value determined by the valve setting. It follows that, because pressure transformer 45 maintains a constant proportional relation between the low pressure of fluid 43 and the high pressure of the medium in chamber 67, the increase in the latter pressure terminates so that such high pressure stays constant. Moreover, because die 65 is acting as a free piston so as to maintain equality between the pressures in chambers 67 and 66, the high pressure of the medium in the extrusion chamber 66 likewise becomes constant. Thus, the effect of the opening of valve 53 is to establish constant pressure conditions in each of chambers 44, 66 and 67.

Pump 38, however, continues to operate during the constant pressure stage so as to try to increase the pressure of the fluid 28 in chamber 29. Since, during that stage, the high pressure end of device 30 sees no increase in pressure in chmaber 66, the further pressurizing of fluid 28 drives the die 65 downward at a rapid rate. When so driven, the die displaces downwardly the medium 20 in chamber 67 to cause a downward forcing by that medium of the pressure transformer 45, and the downward motion of device 45 in turn causes a further discharging through valve 53 of fluid 43.

The constant pressure stage ends when the downward movement of the die is arrested by engagement of the die with the stop 75. Thereupon, the motion of device 45 is also stopped, no further fluid discharges through valve 53, and both the fluid 43 and the medium 20 in chamber 67 remain at constant volume and, also, at the respective constant pressures which they had previously.

After die 65 has been so stopped, pump 38 continues to pressurize the fluid 28 to produce a second increase in the low pressure of that fluid and (through pressure multiplier 30) a proportionate build-up in the high pressure of the medium 20 in chamber 66. The increasing pressure in chamber 66 produces an increasing pressure differential between that pressure and the constant pressure of the medium in chamber 67. Such pressure differential rises until it reaches the "break-through" value at which, for the pressures then obtaining in chambers 66 and 67, the differential is high enough to initiate extrusion of the billet 70. At that "break-through" value, the hydrostatic pressure of the medium in chamber 66 forces the material of the billet through the die passage 68 and into chamber 67 where the material forms an elongated continuous extrusion.

The introduction into chamber 67 of the extrusion tends to increase the pressure in that chamber so as to lower the pressure differential to a value at which the extrusion of the billet would terminate. As soon, however, as the pressure in chamber 67 increases incrementally beyond its previously constant value, a proportionate small increase is imparted by transformer 45 to fluid 43 to cause valve 53 to open and permit discharge of more fluid from the chamber 44. It follows that, as fast as the extrusion is forced into chamber 67, room is made for that extrusion in the chamber by a downward movement of device 45 which displaces fluid from the chamber 44 and through the valve. Because the volume of chamber 67 so expands at a rate balancing the volumetric rate of entry into the chamber of the extrusion, the pressure in chamber 67 does not rise more than incrementally beyond its previous constant value.

The extruding of the billet continues as described until substantially all of the billet material has been forced through the die passage 68. The extruding stage ends when so much of the billet material has been forced through the die passage that the remaining butt no longer acts as a seal isolating the medium in chamber 66 from that in chamber 67. When such moment is reached, the pressure differential between the two chambers tends to force a slug of the medium 20 at high speed through passage 68, so as to set up a pressure surge in the system. Any such incipient surge is, however, damped out in the following ways. First, device 45 responds to any increase in pressure in chamber 67 to move downward so as to attenuate that increase. Second, if the incipient surge develops in chamber 67 an oscillating pressure of which the peak amplitude rises above the pressure level in chamber 66, then die 65 moves upward to attenuate that peak of oscillating pressure. Hence, both of devices 45 and 65 "cushion" an incipient surge to prevent its developing any significant strength.

After the butt of the billet no longer acts as a seal for die passage 68, a brief period intervenes before pump 38 can be turned off to de-activate the apparatus. During that period, therefore (and because chambers 66 and 67 are now in pressure communication through passage 68), the action of pump 38 would tend (in the absence of any compensating factor) to build up the pressure in chamber 67 to the high static pressure value characterizing chamber 66 during the extruding of the billet. As before, however, any increase in the pressure of chamber 67 above its constant level (set by devices 45 and 53) will force device 45 downward to increase the pressure in chamber 44 to cause valve 53 to open to thereby relieve that pressure increase. Hence, there is no static increase in pressure in chamber 67 during the period before pump 38 can be turned off. There is, however, in chamber 66 a decrease in static pressure because that pressure must be the same as in chamber 67 (now that the two chambers are in pressure communication) and, for the reasons stated, the pressure in chamber 67 cannot rise above its set constant pressure level.

The operation is completed by opening the apparatus, as before described, and removing the extrusion. Thereafter, the system may be readied to effect another extrusion.

In connection with the operation of the FIGURE 1 system, the high pressures in the chambers 66 and 67 produce heavy respective axial loading forces on the rams 25 and 40. Because, however, those rams are slidably received in opposite ends of the bore 11 of chamber 10 so as to serve as plug-type end closures for that bore, such axial loading on the rams is not transmitted to the container shell to stress it in axial tension. Also, there is no axial compressive stress on the shell. Hence, the shell is better able to withstand the high radially outward pressure exerted upon it from its interior than if the shell were to be simultaneously subjected both to that radially outward pressure and to an axial stress.

The outward axial pressure loads on the rams 25 and 40 is absorbed as follows. The upward load on ram 25 is transmitted through that ram, ram 26, fluid 28 in chamber 29, and plug 35 to the upper crosshead 39 of the load-bearing frame 34. In like manner, the downward load on ram 40 is transmitted through that ram, ram 41, the fluid 43 in chamber 44 and the plug 50 to the lower crosshead 59 of the frame. The oppositely directed loads on the two crossheads are then transmitted through the pins 62 to the two sets of tie-beams 60 and 61 so as to stress both sets of tie-beams in tension. By virtue of the equal but oppositely directed axial loads being so coupled together through the tie-beams, the two loads cancel each other out. Thus, the axial component of the pressure within container 10 is wholly absorbed outside that container by a load-bearing frame in a manner similar to that disclosed in co-pending application Ser. No. 356,171, filed Mar. 31, 1964, and owned by the assignee hereof.

The FIG. 1 apparatus provides the advantage among others that it avoids the need for high pressure control devices in order to regulate the high pressures developed in one or both of the extrusion and discharge chambers of the liquid-to-liquid extrusion system. As another advantage, the pressure in the discharge chamber 67 is developed as a response to the pressure developed in the extrusion chamber 66, wherefore the apparatus avoids the problems encountered when the two chambers are independently pressurized. As earlier described only one low pressure hydraulic actuating means (pump 38) is needed to produce pressures of appropriate level in both of the high pressure chambers of the apparatus.

MODIFICATIONS

In the FIG. 1 system, the removal of extrusions from container 10 and the introduction of billets thereinto requires the removal from hydraulic cylinder 27 (and the subsequent replacement in that cylinder) of the pressure-transforming device 30 which may be heavy and inconvenient to handle. FIGURE 2 shows a modification of the FIG. 1 system wherein access may be gained to the interior of container 10 without removal of the pressure-multiplying transformer.

In the FIG. 2 modification, the cylinder 12 is made somewhat longer than in FIGURE 1. A passive plug 90 is disposed in slidably received relation in the upper end of the bore section 14 enclosed by cylinder 12. Plug 90, accordingly, provides an easily removable end closure for the upper end of the extrusion chamber 66 formed within that bore section. The lower end of plug 90 is encircled by a seal device (of the type shown in FIGURES 1–4 of U.S. Patent 3,156,475) which seals the inner face between the plug and the bore wall against upward leakage past the seal of the highly pressurized medium 20 in chamber 66. To prevent plug 90 from being forced out of bore section 14 by the high pressure in the extrusion chamber, the plug is directly backed by the upper crosshead 39 (FIG. 1) of the ganged plate frame 34.

To gain access to the interior of bore 11 in container 10 (for the purpose, say, of introducing a billet 70 or of removing die 65 and an extrusion below it), the upper crosshead 39 is simply swung away from plug 90 to leave that plug exposed, and the plug is then lifted out of the bore. Later, the upper end of container 10 is reclosed by replacing the plug in the bore and then swinging the upper crosshead downwardly to connect it back into frame 34 in the manner already described in connection with FIGURE 1.

The mentioned medium 20 is pressurized by a hydraulic pressure transformer 95 disposed to one side of the cylinder 12. As shown, the transformer 95 is comprised of a high pressure ram section 96 and a low pressure ram section 97. Each of the ram sections has thereon a seal device 94 similar to the devices 80 of FIGURE 1. Ram section 97 is slidably received in a hydraulic cylinder 98 to be operably coupled with low pressure fluid 99 in a chamber 100 provided by cylinder 98 to the rear of ram 97. The fluid 99 is pressurized through a conduit 101 by the pump 38 (FIG. 1). The high pressure ram 96 of transformer 95 is slidably received in an opening or sidebore 102 formed in the sidewall of cylinder 12 so as to be spaced from plug 90 and to be operably coupled with the medium 20 in chamber 66. By virtue of so being received in a sidebore, the ram section 96 is out of the way so as to not interfere with the direct access to the interior of the bore 11 of container 10 when plug 90 is removed.

The transformer 95 operates as a pressure multiplier (like the transformer 30 of FIGURE 1) to develop a high pressure in chamber 66 and, ultimately, to cause extrusion of the billet 70.

When the upper end of the FIGURE 1 system is modified in the manner shown by FIGURE 2, it is still necessary to lift die 65 out of the bore in order to remove an extrusion. The need for removing the die can, however, be eliminated by also modifying the lower end of the FIGURE 1 system in a manner shown in FIGURE 3. That is, the chamber 67 in cylinder 13 is closed at its lower end by a passive plug 110 slidably receieved in bore section 15 and rendered fluid-tight by a seal device 111 (of the sort already described) disposed around the plug. Absorption of the axial pressure load on the plug is provided by a direct backing of the plug by the lower crosshead 59 (FIG. 1) of the gang-plate frame 34. The medium 20 in chamber 67 is operably coupled through an opening 112 in the wall of bore section 15 to the high pressure ram 113 of a pressure-attenuating hydraulic pressure transformer 115 having a low-pressure ram section 114 operably coupled to low pressure fluid 116 in a chamber 117 provided to the rear of ram 14 by a hydraulic cylinder 118. The maximum pressure level attainable by the fluid 116 is set by a coupling of the interior of chamber 117 through a conduit 119 to the pressure relief valve 53 (FIG. 1). Further details of the structure and operation of the FIG. 3 modification will be evident from the descriptions already given of the lower end of the FIG. 1 system and of the FIG. 2 modification.

Should the construction of FIG. 2 be found undesirable because its feature of direct insertion of the ram 96 into the wall of cylinder 12 results in a wall opening large enough to materially weaken the wall of the bore, then the FIG. 2 structure may be further modified in accordance with the showing in FIG. 4. In the FIG. 4 construction, the interior of the hydraulic cylinder 98 is shaped to provide a supplemental fluid chamber 130 ahead of the high pressure ram 96, and that chamber 130 is in turn coupled through a narrow opening or passage 131 to the extrusion chamber 66 within container 10. Because the passage 131 is of small diameter, it has little effect on the strength of the wall surrounding the chamber 66.

In like manner, the FIG. 3 modification of the lower end of the FIG. 1 system may be further modified in accordance with the showing of FIG. 4 to provide ahead of high-pressure ram 113 a supplemental fluid chamber which connects through a narrow passage with the discharge chamber 67 in container 10.

FIG. 5 shows a modification of the means which axially divides the interior of the pressure container 10 into the chambers 66 and 67, and which divider means is of a character to provide a stationary die means and die passage. More specifically, in the FIG. 5 structure an axial divider 140 is fixedly secured to the interior wall of the bore section 14 within cylinder 12. Like die 65 (FIG. 1), the divider 140 has in it a die passage 141 which connects the chambers 66 and 67, and through which the billet 70 may be extruded from the former to the latter chamber. In contrast, however, to die 65, the divider 140 also has in it a plurality of holes angularly spaced around the die passage 41 and extending axially through the divider. In each of those holes is received an axially movable plunger 143 having its lower end in chamber 67 and its upper end in chamber 66. Disposed around each of the plungers 143 are seal devices 144 (of the sort previously described) which prevent the leakage of pressurized medium 20 from chamber 66 to chamber 67 through the interface between the exterior of each plunger and the interior wall of the hole in which that plunger is received. Each plunger is capped by a head 145 of larger diameter than the plunger itself.

In operation, the plungers 143 provide the free piston action which in FIGURE 1 is provided by the die 65 as a whole. That is, when transformer 30 (FIG. 1) pressurizes the medium 20 in chamber 66, the resulting high pressure drives the plungers 143 downward to impart high pressure to the medium 20 in chamber 67. The relief valve 53 operates as before to control the maximum pressure level attained in the latter chamber. While the downward movement of the plungers continues, such movement serves to equalize the pressures in the chambers 66 and 67. That downward movement is, however, arrested by the engaging of the plunger heads 145 with the top of divider 140. Thereafter, the continued pressurizing of chamber 66 creates, as previously described (in connection with FIG. 1), a pressure differential (between chambers 66 and 67) which effects the extrusion of billet 70.

The above-described embodiments being exemplary only, it is to be understood that additions thereto, modifications thereof, and omissions therefrom can be made without departing from the spirit of the invention, and that the invention comprehends embodiments differing in form and/or detail from those specifically described. For example, the free piston aspect of the present invention has applications extending beyond the field of liquid-to-liquid extrusion.

Accordingly, the invention is not to be considered as limited, save as is consonant with the recitals of the following claims.

What I claim is:

1. Apparatus comprising, means enclosing an extrusion chamber for a billet and a discharge chamber for the extrusion, said two chambers being each operably filled with a highly pressurized hydrostatic pressure transmissive medium which is at greater and lesser pressure in, respectively, said extrusion chamber and in said discharge chamber so as to effect extrusion of the billet from the former into the latter chamber, hydraulic pressure transformer means having a high pressure end operably coupled to the medium in said discharge chamber and having a low pressure end received in hydraulic cylinder means to be operably coupled with low pressure fluid therein, said transformer means providing a proportional relation between the low pressure of said fluid and the high pressure of the medium in said discharge chamber, and pressure regulating means coupled to said cylinder means to determine the low pressure of said fluid to thereby determine by the proportioning action of said transformer means the high pressure of said medium in said discharge chamber.

2. Apparatus as in claim 1 in which said regulating means is low pressure relief valve means operable to set an upper limit on the pressure of said fluid in said cylinder means.

3. Apparatus for effecting hydrostatic extrusion of a billet comprising, pressure container means having an axially extending hollow interior, means axially dividing said interior into first and second chamber means each operably filled with a hydrostatic pressure transmissive medium adapted to be highly pressurized, at least part of said divider means being in the form of axially movable piston means which is fluid tight during said extrusion and which has opposite ends operably coupled to the respective pressures in said two chamber means, and said divider means having therein an axial passage connecting said two chamber means to permit said extrusion into said second chamber means of said billet when seated in said first chamber means over said passage, pressurizing means operably coupled to the medium in one of said chamber means to impart high pressure to such medium and to thereby actuate said piston means to impart high pressure to the medium in the other of said chamber means, pressure differential generating means operable to render the pressure of the medium in said first chamber means greater than that of the medium in said second chamber means so as to effect said extrusion of said billet, and wherein pressurizing means imparts high pressure to the medium in said first chamber means to thereby actuate said movable piston means to impart high pressure to the medium in said second chamber means, and in which said pressure differential generating means comprises stop means for limiting the movement of said piston means towards said second chamber means.

4. Apparatus as in claim 3 further comprising pressure control means responsive to the high pressure in said second chamber means to set an upper limit to the value of such pressure.

5. Apparatus as in claim 4 in which said pressure control means comprises hydraulic pressure transformer means having a high pressure end operably coupled to the medium in said second chamber means and a lower pressure end received in hydraulic cylinder means to be operably coupled to low pressure fluid in said cylinder means, said control means further comprising low pressure relief valve means coupled to said cylinder means to set an upper limit to the low pressure of said fluid to thereby set through said transformer means an upper limit to the high pressure of said medium in said second chamber means.

6. Apparatus for effecting hydrostatic extrusion of a billet comprising, pressure container means having an axially extending hollow interior, means axially dividing said interior into first and second chamber means each operably filled with a hydrostatic pressure transmissive medium adapted to be highly pressurized, at least part of said divider means being in the form of axially movable piston means which is fluid tight during said extrusion and which has opposite ends operably coupled to the respective pressures in said two chamber means, and said divider means having therein an axial passage connecting said two chamber means to permit said extrusion into said second chamber means of said billet when seated in said first chamber means over said passage, pressurizing means operably coupled to the medium in one of said chamber means to impart high pressure to such medium and to thereby actuate said piston means to impart high pressure to the medium in the other of said chamber means, pressure differential generating means operable to render the pressure of the medium in said first chamber means greater than that of the medium in said second chamber means so as to effect said extrusion of said billet, and wherein said interior of said container means is in the form of a hollow bore, and in which said divider means is both a die means and a free piston in which said passage is formed, said free piston being slidably received in said bore to axially divide said bore into said first chamber means and second chamber means, said apparatus further comprising seal means disposed around said free piston to provide a pressure seal between said piston and the wall of said bore, and said free piston being rendered fluid tight by the seating of said billet over said passage, and wherein said free piston is driven by the high pressure of the medium in said first chamber means to impart high pressure to the medium in said second chamber means, said apparatus further comprising stop means disposed in said bore to limit the movement of said free piston towards said second chamber means.

7. Apparatus comprising pressure container means having therein an axially extending hollow bore open at both of first and second opposite ends of said bore, die means slidably received in said bore to axially divide said bore into first and second chambers towards, respectively, said first and second ends and each operably filled with a hydrostatic pressure transmissive medium, said die means having therein an axial passage connecting said chambers to permit extrusion into said second chamber of a billet seated in said first chamber over said passage, and said die means being fluid tight when said billet is so seated, stop means in said bore to limit the movement of said die means towards said second chamber, a pressure multiplier having a high pressure ram section slidably received in said first end of said bore to close said first chamber, and having a low pressure ram section slidably received in a first hydraulic cylinder to be operably coupled with low pressure fluid in said cylinder, a pressure attenuator having a high pressure ram section slidably received in said second end of said bore to close said second chamber and having a low pressure ram section slidably received in a second hydraulic cylinder to be operably coupled with low pressure fluid in said second cylinder, low pressure hydraulic means for pressurizing said fluid in said first cylinder, and pressure relief valve means coupled to said second cylinder to set an upper limit to the pressure value of the fluid therein.

8. Apparatus comprising, a pressure container having therein an axially extending hollow bore open at both ends, die means disposed in said bore to axially divide said bore into first and second chambers each operably filled with a highly pressurized medium at greater pressure in said first chamber than in said second chamber, said die means having therein an axial passage connecting said two chambers to permit the pressure differential between said two chambers to extrude into said second chamber a billet seated over said passage in said first chamber, first and second plug means slidably received in the opposite ends of said bore to provide end closures for, respectively, said first and second chambers, each of said plug means being loaded by outward pressure from the corresponding chamber, and load bearing frame means disposed around said container and backing each of said plug means to absorb the load thereon and to couple together in opposed relation the respective loads on said two plug means.

References Cited

UNITED STATES PATENTS

| | | | |
|---|---|---|---|
| 2,558,035 | 6/1951 | Bridgman | 72—60 |
| 3,344,636 | 10/1967 | Pugh | 72—60 |
| 3,354,685 | 11/1967 | Green | 72—253 |
| 3,364,716 | 1/1968 | Averill | 72—253 |
| 3,364,717 | 1/1968 | Green | 72—253 |

CHARLES W. LANHAM, Primary Examiner

L. A. LARSON, Assistant Examiner

U.S. C. X.R.

72—253